United States Patent
Ludwig et al.

(10) Patent No.: US 9,237,480 B2
(45) Date of Patent: Jan. 12, 2016

(54) ACCELERATED CONTENT DELIVERY

(75) Inventors: Reiner Ludwig, Hürtgenwald (DE); Pablo Molinero Fernandez, Madrid (ES); Krister Svanbro, Sollentuna (SE); Per Willars, Vaxholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 240 days.

(21) Appl. No.: 13/880,192

(22) PCT Filed: Oct. 24, 2011

(86) PCT No.: PCT/EP2011/068569
§ 371 (c)(1),
(2), (4) Date: Apr. 18, 2013

(87) PCT Pub. No.: WO2012/052568
PCT Pub. Date: Apr. 26, 2012

(65) Prior Publication Data
US 2013/0229918 A1  Sep. 5, 2013

(30) Foreign Application Priority Data

Oct. 22, 2010 (WO) .................. PCT/EP2010/065985
Oct. 22, 2010 (WO) .................. PCT/EP2010/065987
Oct. 22, 2010 (WO) .................. PCT/EP2010/065996
Jul. 8, 2011 (WO) .................. PCT/EP2011/061685
Aug. 11, 2011 (WO) .................. PCT/EP2011/063860

(51) Int. Cl.
*H04W 28/02* (2009.01)
*H04L 12/851* (2013.01)
*H04L 12/28* (2006.01)
*H04L 12/801* (2013.01)

(52) U.S. Cl.
CPC ......... *H04W 28/0268* (2013.01); *H04L 47/245* (2013.01); *H04L 47/14* (2013.01)

(58) Field of Classification Search
None
See application file for complete search history.

(56) References Cited

U.S. PATENT DOCUMENTS

| 6,470,029 | B1 * | 10/2002 | Shimizu ........................ 370/468 |
| 7,310,686 | B2 | 12/2007 | Uysal et al. |
| 2001/0038609 | A1 * | 11/2001 | Yamaguchi ................... 370/229 |
| 2008/0235400 | A1 | 9/2008 | Slocombe et al. |

(Continued)

FOREIGN PATENT DOCUMENTS

| CN | 1668024 A | 9/2005 |
| CN | 1968227 A | 5/2007 |

(Continued)

OTHER PUBLICATIONS

Ekstrom, H. "QoS Contra 1 in the 3GPP Evolved Packet System." IEEE Communications Magazine, IEEE Service Center, Feb. 2009, pp. 76-83, Piscataway, US.

(Continued)

*Primary Examiner* — Kevin C Harper
(74) *Attorney, Agent, or Firm* — Murphy, Bilak & Homiller, PLLC

(57) ABSTRACT

The invention relates to a content delivery entity (100) configured to deliver a first data traffic from a first Internet content provider (310) to a mobile user equipment (200) via an access network of a mobile communications network. The entity (100) comprises an interface (113) configured to detect the first data traffic that shall be treated with priority. An acceleration unit (120) is configured to accelerate the delivery of the first data traffic from the first Internet content provider to the content delivery entity, and a controller (110) is configured to forward the first data traffic from the first Internet content provider (310) to the mobile user equipment (200) in the access network in such a way that the first data traffic from the first Internet content provider (310) is routed to the mobile user equipment (200) in the access network with a priority different from that of a second data traffic that is delivered from a second Internet content provider (330, 390) through the access network.

18 Claims, 5 Drawing Sheets

(56) References Cited

U.S. PATENT DOCUMENTS

| | | |
|---|---|---|
| 2009/0172138 A1 | 7/2009 | Wang et al. |
| 2010/0017846 A1* | 1/2010 | Huang et al. ................... 726/1 |
| 2010/0054222 A1 | 3/2010 | Rune |
| 2010/0128665 A1* | 5/2010 | Kahn ............................ 370/328 |
| 2011/0060838 A1 | 3/2011 | Yeung et al. |

FOREIGN PATENT DOCUMENTS

| | | |
|---|---|---|
| CN | 101480002 A | 7/2009 |
| WO | 2006004471 A1 | 1/2006 |
| WO | 2007079773 A1 | 7/2007 |
| WO | 2007087828 A1 | 8/2007 |
| WO | 2007129199 A1 | 11/2007 |
| WO | 2010112077 A1 | 10/2010 |

OTHER PUBLICATIONS

Akamai Technologies, Inc. "Akamai's Application Acceleration Services: Transform the Internet into a Business-Ready Application Delivery Platform." Akamai Technologies, Inc., White Paper, Oct. 2008, pp. 1-12.

* cited by examiner

ACCELERATED CONTENT DELIVERY

TECHNICAL FIELD

The present invention relates to a content delivery entity configured to deliver a first data traffic from a first Internet content provider to a mobile user equipment via an access network of a mobile communications network, to a method for delivering the first data traffic and to a controller.

BACKGROUND

In communication networks, differentiated handling of network traffic may be used to meet requirements with respect to Quality of Service (QoS) depending on the type of network traffic. For this purpose, a forwarding treatment of data packets, i.e., the way of forwarding data packets by a node, may be adjusted so as to obtain a desired QoS level or prioritize certain types of traffic over others.

For example, in mobile communication networks network traffic related to a specific service may be directed to a bearer offering a certain QoS level. In this respect, a bearer is considered to be an information transmission context or path of defined characteristics, e.g. capacity, delay and/or bit error rate. It is possible to establish a number of bearers between a gateway of a mobile communications network and a user equipment (UE), e.g., a mobile phone or other type of mobile terminal. A bearer may carry downlink (DL) data traffic in a direction from the network to the user equipment, and may carry data traffic in an uplink (UL) direction from the user equipment to the network. In the gateway and in the UE the data traffic, which includes a plurality of IP data packets (IP: "Internet Protocol", which may be the IP Version 4, also referred to as IPv4, or the IP Version 6, also referred to as IPv6) can be filtered, e.g. using IP 5-tuple packet filters, thereby directing the IP data packets to a desired bearer.

Studies have shown that despite the use of prioritized traffic to a mobile user equipment users are still not satisfied with the speed of how content from an Internet content provider is provided to the user.

Thus, a need exists to further accelerate a data traffic from an Internet content provider to a mobile user equipment.

SUMMARY

This need is met by the features of the independent claims. In the dependent claims further embodiments are described.

According to an embodiment of the invention a content delivery entity is provided configured to deliver a first data traffic from a first Internet content provider to a mobile user equipment via an access network of the mobile communications network. The content delivery entity furthermore contains an interface configured to detect the first data traffic that shall be treated with priority. Furthermore, an acceleration unit is provided configured to accelerate the delivery of the first data traffic from the first Internet content provider to the content delivery entity. The content delivery entity furthermore contains a controller configured to forward the first data traffic from the first Internet content provider to the mobile user equipment in the access network in such a way that the first data traffic from the first Internet content provider is routed to the mobile user equipment in the access network with a priority different from that of a second data traffic that is delivered from a second Internet content provider through the access network. The content delivery entity allows acceleration of the content delivery from the content provider in the Internet to the content delivery entity and to accelerate the first data traffic in the access network of the mobile communications network.

The acceleration unit accelerates the availability of the content of at the content delivery entity and the controller accelerates the traffic in the access network. Through the combination of acceleration means a fast delivery of the first data traffic to the user equipment is obtained which can be used for selected data traffic.

According to a further embodiment a method for delivering the first data traffic from the first Internet content provider to the mobile user equipment via the access network of the mobile communications network is provided. The content delivery entity detects the first data traffic that shall be treated with priority. Furthermore, the delivery of the first data from the Internet content provider to the content delivery entity is accelerated and the first data traffic from the first Internet content provider to the mobile user equipment is forwarded in the access network in such a way that the first data traffic from the first Internet content provider is routed to the mobile user equipment in the access network with a priority different from that of a second data traffic that is delivered from a second Internet content provider through the access network.

The invention furthermore relates to the controller mentioned above.

The invention will be further described with reference to the accompanying drawings.

DETAILED DESCRIPTION

In the following the invention will be explained in more detail by referring to exemplary embodiments and to the accompanying drawings. The illustrated embodiments relate to concepts of handling of a data flow traffic from an Internet content provider to a mobile user equipment (UE).

The present invention maybe used, e.g., to specify a technical solution on architecture level for how content from peering content providers (CPs) can be delivered faster to user devices connecting through the MBB (Mobile Broadband) access network of a peering MBB operator. It is assumed that commercially available solutions are used for content delivery from the CP's site to a MBB operator's gateway (GW) site. For this solution CDN (Content Delivery Network) Cache for cacheable content and CDN Edge for uncacheable content is used as an example and can be provided, e.g., by a CDN provider, e.g., by Akamai, but this should not be understood that the following text is limited to this example. Content acceleration across the MBB access network including the radio and mobile backhaul (see "SmartPipe Controller" in FIG. 1) is considered.

The concepts may be applied in a mobile communications network according to the 3GPP (Third Generation Partnership Project) technical specifications. However, it is to be understood that the illustrated concepts may be applied in other types of mobile communications networks.

Figure 1:
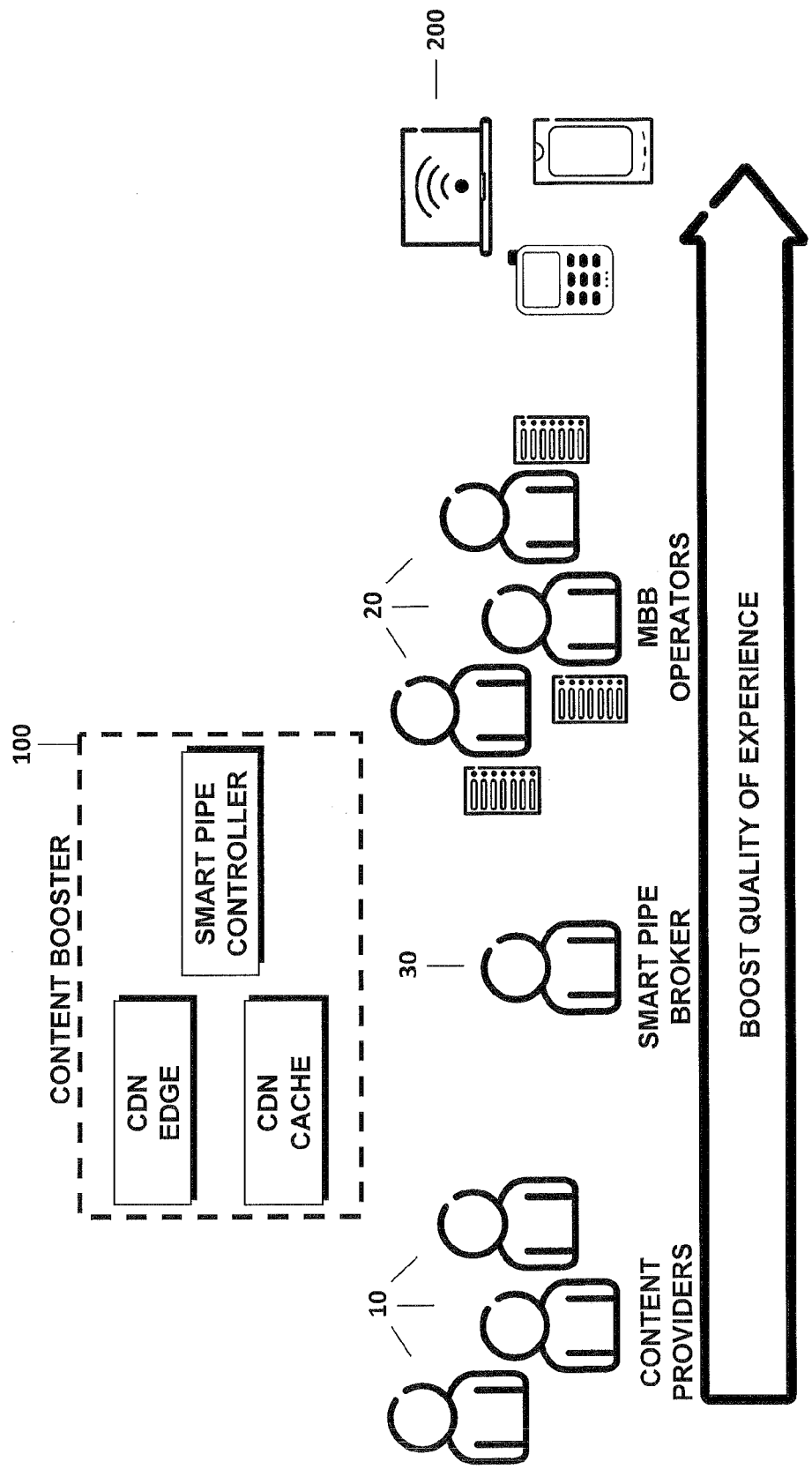
FIG. 1 schematically illustrates how the quality of experience for a content delivery is improved for the user.

In FIG. 1 it is schematically shown how a content from content providers 10 is delivered to mobile user entities 200 using a mobile communications network provided by mobile Broadband (MBB) operators 20 using a content delivery entity 100, also named content booster hereinafter. A SmartPipe broker 30 is an entity that accelerates the content delivery from the content providers 10 to the mobile user equipment 200.

The SmartPipe Broker may be an entity, e.g., a company, that has signed peering agreements with multiple content providers (e.g., e-bay, Amazon, Expedia, Google, etc.) on one side and multiple MBB (Mobile Broad Band) operators on the other side (as can be deduced from FIG. 1).

The service offering of the SmartPipe Broker is an improved quality of experience for content delivery. This is also referred to as "content acceleration", i.e., still content appears faster on the display of a user device, and moving content displays just fine (e.g., no freezing of the video).

To realize this service offering the SmartPipe Broker 30 may co-locate networking equipment ("Content Booster" 100) with a MBB operator's gateway site (GGSN/PDN-GW Gateway GPRS Support Node, Packet Data Network-Gateway) or Internet peering point. The Content Booster operates in two steps:

1. Accelerate content delivery from the content provider up to the GGSN/PGW, and
2. Accelerate content delivery from the GGSN/PGW to the UE ("MBB turbo").

Step 2 is optional, and it is up to the content provider to select it, optionally against payment, or not.

The SmartPipe Broker's value proposition towards content providers is the following:

Increased revenue: "33% of consumers will abandon a Web page that takes longer than 4 seconds to load, and more than 60% would not likely purchase again online from a company with a poor-performing site." [Jupiter Research]

The SmartPipe Broker's value proposition towards MBB operators:

Increased subscriber base/reduced churn due to happier customers.
Reduced costs due to cached content reducing the data volume that is transmitted across peering points.
New sales opportunity for MBB capacity: SmartPipe Broker pays MBB operator for letting SmartPipe Broker get content accelerated.

Figure 2:
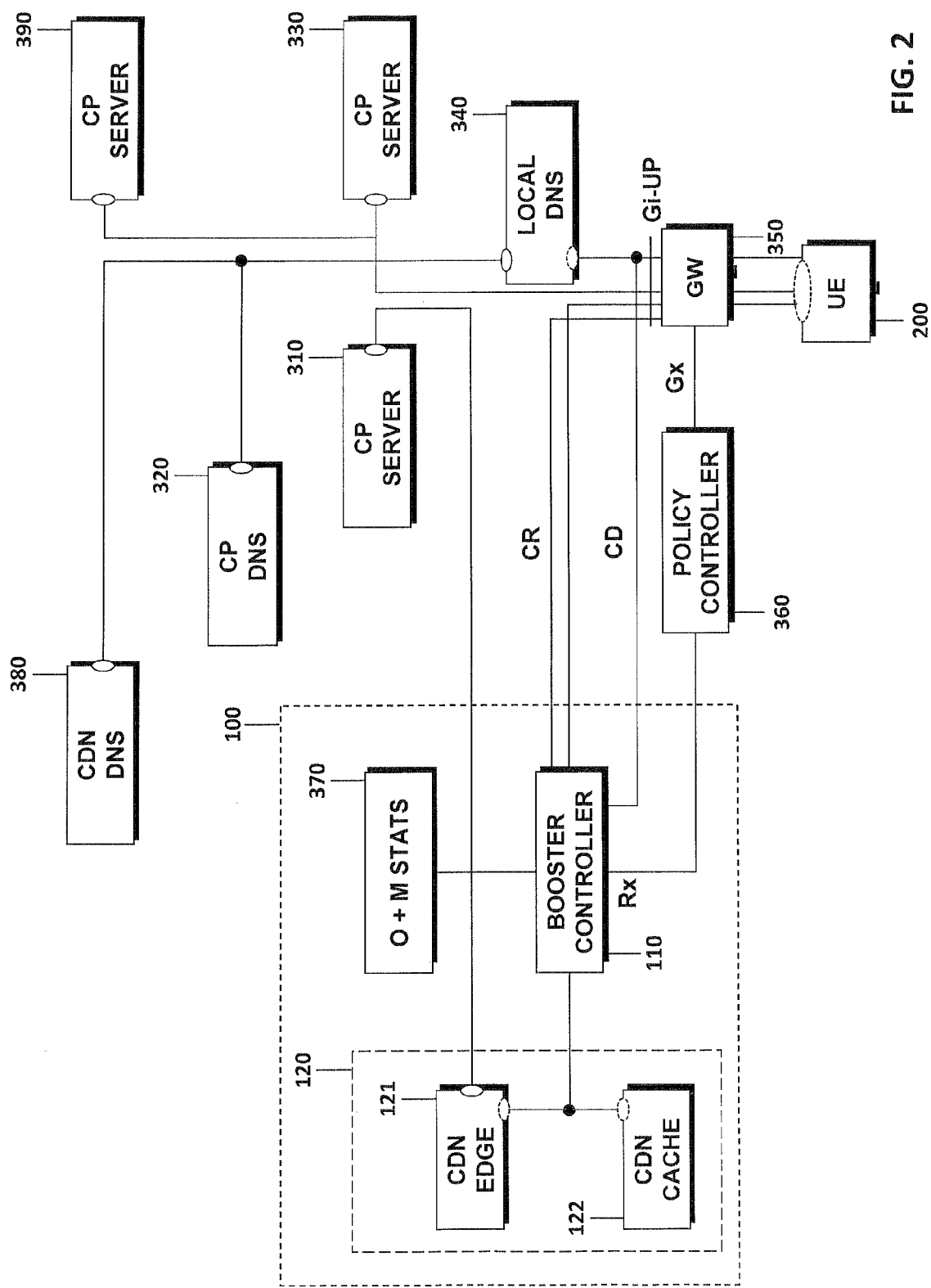
FIG. 2 is a schematic more detailed view of the architecture used for fast content delivery.

FIG. 2 shows a more detailed view of a communication network environment with a content booster architecture, in which a fast delivery of data traffic is possible. The purpose of the content booster architecture is to offer an improved QoE in content delivery from one or more content providers 10 as illustrated in FIG. 1. As illustrated, the content booster architecture includes infrastructure of a mobile broadband (MBB) operator, i.e., a GW 350 to which a UE 200 may attach, a policy controller 360, a local Domain Name System (DNS) 340, and an Internet Peering Point Gi-UP. Co-located with this infrastructure is a content booster infrastructure or content delivery entity 100, which includes a boosting controller 110. Further, the content delivery entity 100 includes an edge server 121 of a CDN and/or a cache server 122 of a CDN. The purpose of the edge server 121 and the cache server 122 is to accelerate delivery of content from a content provider (CP) server 310 to the GW 350 by acting as a local proxy and a local cache, respectively. The edge server 121 and the cache server 122 build an acceleration unit that accelerates the delivery of the data traffic from the Internet content provider server 310 to the edge point of the Internet, the gateway 350.

Further, the close association with the infrastructure of the MBB operator allows for accelerating content delivery on the whole path from the content provider via the GW 350 to the UE 200.

In addition, FIG. 2 also illustrates a CP DNS 320, an external CDN DNS 380, and external servers 330, 390, e.g., any type of Internet server. It is to be understood that the content booster infrastructure 100 may actually have interfaces towards a plurality of MBB networks, CPs, and CDNs.

In general terms, the idea of the content booster architecture is to perform differentiated handling of data traffic on a communication path using the content booster infrastructure acting as a broker. The broker may have service agreements on the one hand with one or more CPs, here with CP server 310 e.g., with an Internet auction provider, and on the other hand with one or more MBB operators who in turn have associated subscribers with respective UEs. The broker does not have service agreements with the other CP servers 330, 390. The CPs may also have agreements with CDN providers to host content so that it can transmitted in a differentiated way, e.g., with higher quality of service, to users. The broker may control upgrades or downgrades for priority of traffic between the GW 350 and the UE 200. For this purpose, the controller 110 may inspect end user content request messages, inspect end user DNS replies, keep track of charging and service agreement fulfillment, trigger a priority upgrade request, or trigger a priority downgrade request. For these purposes the boosting controller 110 and in general the content delivery entity 100 may comprise interfaces as depicted in FIG. 2. More specifically, the controller 110 may have an interface with respect to the policy controller 360 in order to downgrade or upgrade priority of traffic, e.g., by initiating bearer control procedures or setup or release priority bearers. As illustrated, this interface may be implemented as the Rx interface according to the 3GPP TSs. Further, the controller 110 may have an interface for receiving copied DNS traffic CD between the GW 350 and the local DNS 340. This allows the controller 110 to identify whether a DNS request is for content from a peered CP requiring prioritized delivery of content by the content delivery entity 100. Further, the controller 110 may have an interface with respect to the GW 350 for receiving copied authentication signaling CR with respect to the GW 350, e.g., signaling according to the Radius protocol or the Diameter protocol. Moreover, the controller 110 may be provided with an interface to an edge server 121 and/or to a cache server 122, as well as an interface with respect to the GW 350. The latter interfaces have the purpose of routing traffic between the edge server 121 and/or cache server 122 and the GW 350 through the controller 110. This traffic comprises the selected data traffic to be prioritized.

The edge server 121 in turn may be provided with an external packet interface with respect to the CP server 310, which allows the edge server 121 to obtain content data for delivery to UEs connected to the GW 350, and an internal packet interface with respect to the controller 110 and the cache server 122. Similarly, the cache server 122 may be provided with an internal packet interface with respect to the controller 110 and the edge server 121. The internal packet interface of the cache server 122 allows the cache server 122 to cache content data obtained by the edge server 121 and to provide cached content data via the controller 110 and the GW 350 to UEs. In some implementations, e.g., in implementations without the edge server 121, the cache server 122 could also be provided with an external packet interface with respect to the CP server 310, which would allow the cache server 122 to directly obtain content data for delivery to UEs connected to the GW 350.

Here, it is to be noted that the internal packet interfaces of the above components of the content delivery entity 100 are preferably implemented with network addresses from a specific range, e.g., IP addresses from a private subnet. Accordingly, it is possible to efficiently differentiate between traffic from the content delivery entity 100 and other traffic, e.g., from the server 330 or 390, using the network addresses in the data packets of the traffic. More specifically, the GW 350 and/or the UE 200 may use packet filters matching the network addresses from the specific range, e.g. for directing packets onto specific bearers towards UE 200.

In some implementations, the components of the content delivery entity 100 may be configured with two different specific ranges of network addresses, e.g., IP addresses from two different private subnets. One specific range may then be associated with peered CPs requiring prioritized delivery of content while the other specific range may be associated with peered CPs not requiring prioritized delivery of content or a different level of prioritization.

The CDN DNS 380 may be configured to resolve a DNS request towards peered CPs accordingly. For example, it may return a corresponding address from the specific range or ranges of network addresses used by the content boosting infrastructure. The CDN DNS 380 may identify the MBB operator by the network address of the local DNS 340.

Summarizing, the acceleration unit 120 containing the CDN server 121 and the CDN cache server 122 accelerate the content delivery to the content delivery entity 100. The purpose of this acceleration is to accelerate the availability of the content at the content delivery entity. The CDN edge 121 may be used for non-cacheable content and will retrieve it from the CP server 310 directly in an accelerated manner. The CDN edge acts as a proxy. The CDN cache 122 is used for cacheable content and will retrieve it from the CP server 310. Then the CDN cache 122 delivers it directly from its local memory or local storage. The access network prioritisation to accelerate the delivery of the data flow in the access network is controlled by controller 110.

The data flow of IP packets from CP server 310 through the content delivery entity 100 to the mobile user equipment 200 is also named the first data traffic which is accelerated as a service agreement between the broker and the content provider exists, and which is faster than a second data traffic from a content provider 330 or 390 which do not have a service agreement with the SmartPipe broker. This second data flow is delivered from one of the CP servers 330 or 390 through the gateway 350 to the same UE 200 which receives the accelerated traffic or to another UE.

As mentioned above, the content delivery entity may detect that a request for a prioritized flow is issued by the UE 200 by monitoring the traffic with the local DNS server 340. In another embodiment however the content delivery entity identifies a content request as a content request for accelerated delivery of data by determining whether the content request is directed to an Internet content provider which has an agreement for accelerated content delivery. The controller 110 may look on the IP address of the edge server 121 or the cache server 122. If the IP address is within a range that is used for CP traffic that shall be radio prioritized it will apply radio priority. Mapping CP traffic to the right edge or cache server is done by the CDN DNS 380.

Figure 3:
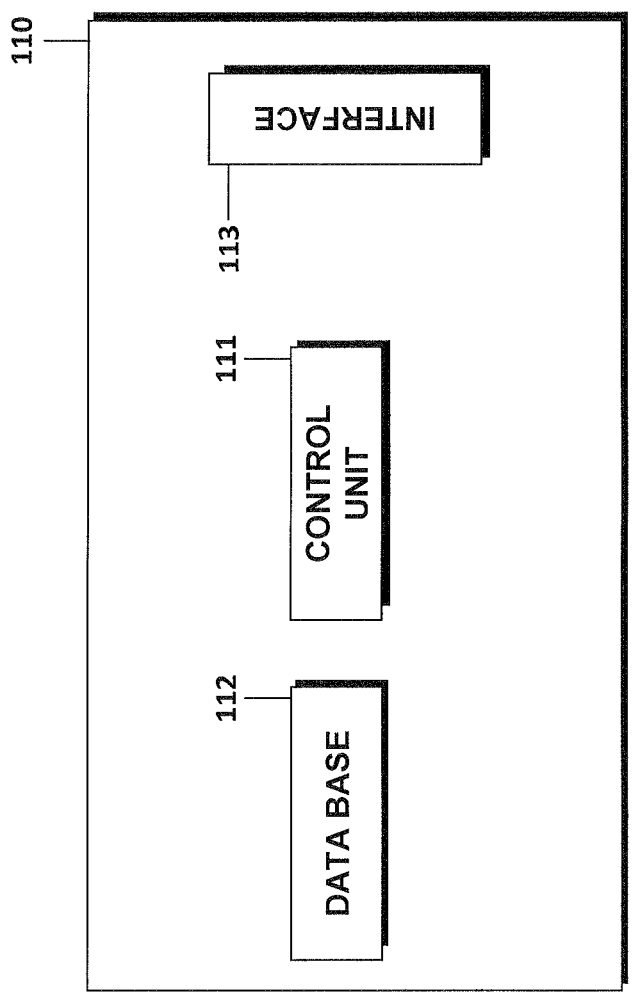
FIG. 3 is a schematic more detailed view of a boosting controller shown in FIG. 2.

In FIG. 3 a more detailed view of the controller 110 is shown. The controller comprises a control unit 111 which is responsible for the acceleration of the content delivery. The controller 110 furthermore contains a database 112 where inter alia a list of IP addresses of the cache/edge servers that serve priority traffic such as server 310 is mentioned for which a service agreement of accelerated content delivery exists. However, the IP list does not need to be provided in the case where all traffic routed via the controller 110 to the edge/cache server shall be prioritized. Based on the list the control unit can identify a content request as a request for which accelerated delivery of traffic is needed. Furthermore an interface 113 is symbolically shown which is configured to identify a content request from a mobile user equipment 200 to deliver content from CP server 310.

Referring back to FIG. 2, the content delivery entity 100 furthermore contains a unit 370 which is configured to determine traffic statistics of the accelerated data traffic through the controller 110.

Unit 370 provides measurement capabilities and report statistics.

In general terms, the controller 110 is configured in such a way that it forwards the first data traffic from the first Internet content provider 310 through the controller 110. Content that is not from a peering content provider should not be delivered through controller 110.

The interface 113 can detect the first data traffic that should be treated with priority in the access network. In one embodiment this is possible by identifying the destination IP address of packets from the mobile user equipment and the source IP address of packets from the acceleration unit 120 as matching a predefined range of IP addresses. Furthermore, the interface may be configured to identify a first content request from the mobile user equipment requesting content from the first internet content provider for providing the first data traffic to said mobile user equipment.

The following list describes functionality and considerations that are preferably already considered in an initial deployment. However this list should not be misunderstood in a way that individual items are essential for the operation. Most items mentioned merely offer advantages based on business considerations or in the specific example of predominantly TCP-based Internet traffic but are not generally essential in technical terms. The content delivery entity may have the following functions or abilities:

able to differentiate between those CPs who have chosen the "MBB turbo" (mobile broadband) i.e. radio prioritization vs. those who have not support mix of new UEs (i.e. with support for dedicated bearers) and old UEs (no support for dedicated bearers).

consideration of TCP-based content sufficient consideration of downlink content sufficient consideration of HTTP-based content minimize the requirements on a MBB operator's deployment Adding potential points of failure for the overall operation of the MBB access should be avoided. User plane elements should have passive bypass in case of system crash or power outage.

Security upper bound of signaling load on Rx (=>signaling load resulting from bearer modify/establish)

interaction with the PCRF and GW through standardized interfaces (multi-vendor)

proof points (how much faster (e.g. a statistical measure) content is delivered) for the SLA (Service Level Agreement) between SmartPipe Broker and CP active measurement capability and report statistics proof points (e.g. if the MBB operator actually provides prioritized connectivity) for the SLA between SmartPipe Broker and MBB operator (the provided information may be based on the specific SLA e.g. in terms of delay measures) active measurement capability and report statistics ability to separate boosted from non-boosted traffic ⇒ content that is not from a peering CP should not need to run through the SmartPipe Controller possibility to configure/provision the elements of the Content Booster (e.g. for reasons of security) high availability able to handle a specific fraction, e.g. 20% of the GW's capacity (the fraction may depend on the fraction of traffic which is potentially delivered with priority by the CDN based on a HW/SW architecture that can scale with load trust relationship between MBB operator and SmartPipe Broker across communication interface (e.g. across Rx) MBB operator's DNS servers should not require adaptations.

As mentioned above the content delivery entity should be able to handle a specific fraction of the capacity of the gateway 350. In general terms, the controller which is connected to the gateway through which the first and the second data traffic are transmitted to the mobile user equipment is configured to control a specified fraction of a data traffic capacity of the gateway for the first data traffic, meaning that for the accelerated data traffic. The acceleration unit, for accelerating the delivery of data may comprise the content data network cache server and the content data network edge server.

Furthermore, the controller may be configured to communicate with the policy controller 360 of the mobile communications network through an Rx interface.

Additionally, the content delivery entity can be configured to identify which type of mobile user equipment is used for requesting the data traffic. Mobile user equipments exist which support the use of dedicated bearers whereas other mobile user equipments do not support the use of dedicated bearers. Based on the identified type of mobile user equipment, the controller 110 can decide whether to set up a dedicated bearer or whether the priority of a default bearer is increased for the time of the data transfer.

In general terms, this means that the controller can be configured to control the priority of the first data traffic by modifying a priority of a default bearer used for the first data traffic. In another embodiment the controller is configured to control the priority of the first data traffic by directing the first data traffic to a dedicated bearer.

Furthermore, the content delivery entity may have the following functionalities and features:

SmartPipe Controller i.e. the controller 110 able to differentiate based on subscriber category SmartPipe Controller able to differentiate based on terminal type (International Mobile Equipment Identity IMEI)

SmartPipe Controller able to sniff on Gi Radius Accounting-IMEI, cell-id (not up-to-date), QoS, etc.

maximize intelligence in MBB-Controller/minimize requirements on PCRF and GW.

FIG. 2 shows an example of an architecture involving a content booster. For simplicity only a single provider, operator and broker are shown. However, the content booster may have interfaces towards a plurality of operators, content providers and content data networks CDN.

In general terms, the idea is to perform a differentiated handling of data traffic on a communication path using a function or node, e.g. a content booster, of a broker. The broker may have service agreements on the one hand with one or more providers, e.g. with an Internet auction provider, and on the other hand with one or more network operators who in turn have associated subscribers with respective user equipment UE. The content providers may also have agreements with CDN providers to host content so that it can transmitted in a differentiated way, e.g. with higher quality of service, to users.

In method terms, it is thus proposed to perform brokering of mobile network resources to Internet content providers in a system which may include for example a network Policy Node, a network Gateway Node an operator's DNS Server, User Equipment and a Content Booster Node. The method may be performed in a content booster node and comprise at least one, some, or all of the steps of:

configuring and maintaining a service level agreement with an Internet content provider configuring and maintaining a service level agreement with a network operator detecting end user request for content owned by content provider managed by Content Booster Node requesting priority upgrade for traffic between the Gateway Node and the User Equipment requesting of priority downgrade for traffic between the Gateway Node and the User Equipment after end user session completion collecting and reporting charging related data collecting and reporting service level agreement fulfillment statistics.

A Content Booster Node may comprise a Controller Node, a CDN edge server and CDN cache server.

A Controller Node can, for example, do one or more of the following items inspect end user content request messages inspect end user DNS replies keep track of charging and SLA fulfillment trigger priority upgrade request trigger priority downgrade request For these purposes the Controller Node and the Content Booster in general may comprise means to perform the corresponding functions, e.g. transmitters, receiver, controllers, memories, circuitry and interfaces to implement them, for example some or all of the interfaces as depicted in FIG. 2.

In the following explanations of/assumptions behind the overall architecture as shown in FIG. 2 are given:

Initially only cooperation with one CDN provider may be done but the numbers of the involved nodes may be subsequently adapted.

SmartPipe Broker: No need to co-locate Content Booster with each GW, but recommended to get maximum acceleration SmartPipe Broker provides a managed service to the operator=>operator will need to provide a secure "sand box" (private subnet) for the deployment of the Content Booster. In other words, the operator is offered a managed service under the requirement that the operator is able to have this managed service; to provide a private IP subnet for the deployment of the content booster.

SmartPipe Controller and CDN boxes (cache & edge server ES) are placed on a local subnet assigned by the MBB operator to the SmartPipe Broker=>GW can route CDNed/non-CDNed traffic differently (i.e. traffic which passed through the CDN or not;=>non-CDNed traffic does not need to be taken through the SmartPipe Controller All CDNed traffic runs through the SmartPipe Controller ⇒ measure for SLAs: north-bound: count number of accelerated HTTP transactions/south-bound: count volume of prioritized traffic Acceleration is provided through traffic prioritization=>1) modify default bearer (works with today's 2G/3G UEs), or 2) establish dedicated bearer (requires new 2G/3G UEs (NW-Requested secondary PDP context) but will work with LTE-capable UEs)

Upgrading/downgrading default bearer's priority is controlled on demand=>preferably dynamic signaling towards GW Establishing dedicated bearers is to be controlled on demand=>preferably dynamic signaling towards GW Note: pre-establishing for all capable UEs a dedicated bearer to carry CDNed traffic is an option. However, it may not be wanted to do so if a significant UE population never generates CDNed traffic or only rarely or only during short periods of time over a day=>licensing of GW capacity based on number of simultaneously established bearers, large number of simultaneously established bearers may create too large CP load and/or shortage of some kind of resource, etc.

Once premium bearer established it will have packet filters catching traffic from the private sub-subnet assigned to the SmartPipe Broker and traffic to/from the MBB operator's local DNS SmartPipe Controller is an Application Function (in 3GPP terms)=>Rx Note: GW can not have multiple Gx sessions for the same UE MBB operator has PCRF with Rx, if not SAPC (Service Aware Policy Controller) may provide this functionality MBB operator trusts SmartPipe Broker to not misuse Rx No need to do differentiated NATing on the GW CDN boxes (cache & ES) act as TCP-split proxies Local DNS sever handles CDNed and non-CDNed traffic DNS traffic between UE and the local DNS server copied to SmartPipe Controller: 1) to be able to identify the UE (dest IP address of DNS response) for which bearer procedure shall be triggered (on Rx the UE is identified by its IP address); 2) to identify whether the DNS request is for content from a peered CP (the local DNS server may cache and thus reply directly to the UE), and if so, whether the CP has chosen the "MBB turbo", or not.

SmartPipe Controller is configured with two ranges of IP addresses on the local subnet belonging to the CDN caches/CDN edges. Range A is associated with peered CPs who have chosen the "MBB turbo" while range B is associated with peered CPs who have not The SmartPipe Broker's DNS server (see "CDN DNS" in FIG. 2) has been configured to resolve a request towards peered CPs accordingly, i.e., it either returns an IP address from range A or B. The SmartPipe Broker's DNS server identifies a MBB operator by the IP address of the MBB operator's DNS server (see "Local DNS" in FIG. 2). Packet filters direct the data traffic to different bearers. The filters can, for example, direct traffic from a certain range of IP addresses to a priority bearer, whereas traffic from another IP address range is not directed to a priority bearer.

A peered CP's DNS server (see "CP DNS" in FIG. 2) has been configured to redirect requests to the SmartPipe Broker's DNS server (see also FIG. 2)

No need for Deep Packet Inspection (DPI) to satisfy any of the above=>SmartPipe Controller may only perform shallow (IP 5-tuple based) inspection If the premium dedicated bearer shall be taken down, the current assumption is that this is done by the application function AF (Rx is stateful) which knows whether a premium connectivity (default bearer with upgraded priority or dedicated bearer with high priority (premium dedicated bearer)) is currently established, or not. If the premium dedicated bearer is dropped (for whatever reason) by the RAN: the AF may need to find this out.

One possibility to accelerate the delivery of the traffic is the upgrading the priority of a default bearer. As a first alternative, if the content delivery entity detects a UE's IP address for the first time the content delivery entity triggers "Rx based priority upgrade". This has the advantage that there is no need for a DNS/HTTP or other protocol awareness in the content entity. A drawback of this solution is that no priority for initial traffic is possible. In another alternative, the content delivery entity triggers the Rx based priority upgrade based on inspecting DNS queries and responses. This would have the advantage of an early upgrade, before the CDNed traffic arrives. Furthermore, this means less load on the controller 110 which may only inspect DNS traffic. A drawback of this solution is that the controller also needs to look at DNS traffic from non-CDNed content and that it relies on short TTL in DNS response (the DNS cache of a mobile user entity times out quickly).

Furthermore, the priority of a default bearer can be downgraded, e.g. after the content delivery is accomplished. In one alternative the controller 110 triggers an Rx based priority downgrade based on IP traffic inactivity timer maintained per UE. This timer may be synchronised with the TTL in the DNS responses going to the UE.

Furthermore, the content delivery entity has to decide whether a default bearer is modified, e.g. for UEs that do not support dedicated bearers, or whether a dedicated bearer is set up. One alternative is that CDN traffic is detected and that this information is signalled via the Rx interface with a single service ID. Furthermore, the PCRF (Policy and Charging Rules Function) knows the terminal capabilities based on the IMEI and decides either the QCI (Quality of Service Class Identifier) of the default bearers PCC (Policy and Charging Control) rule is modified via Gx or a new PCC rule with a new QCI gets installed via Gx. However, it places requirements on the operator's PCRF configuration. The advantage of this solution is that it is according to the 3GGP specification, but it requires support from the PCRF (IMEI based policy decisions, access to IMEI database and a corresponding configuration on the PCRF).

As an alternative the controller 110 knows the terminal capabilities using IMEI and upon signals a CDN traffic is detected via Rx with two service IDs, a first service ID is used meaning that the QCI of the default bearer's PCC rule is modified via Gx. As an alternative a service-id B might be used meaning that a new PCC rule a new QCI gets installed via Gx. This solution has the advantage that it has a minimum impact on the PCRF, however in this solution the controller requires access to IMEI databases.

Figure 4:
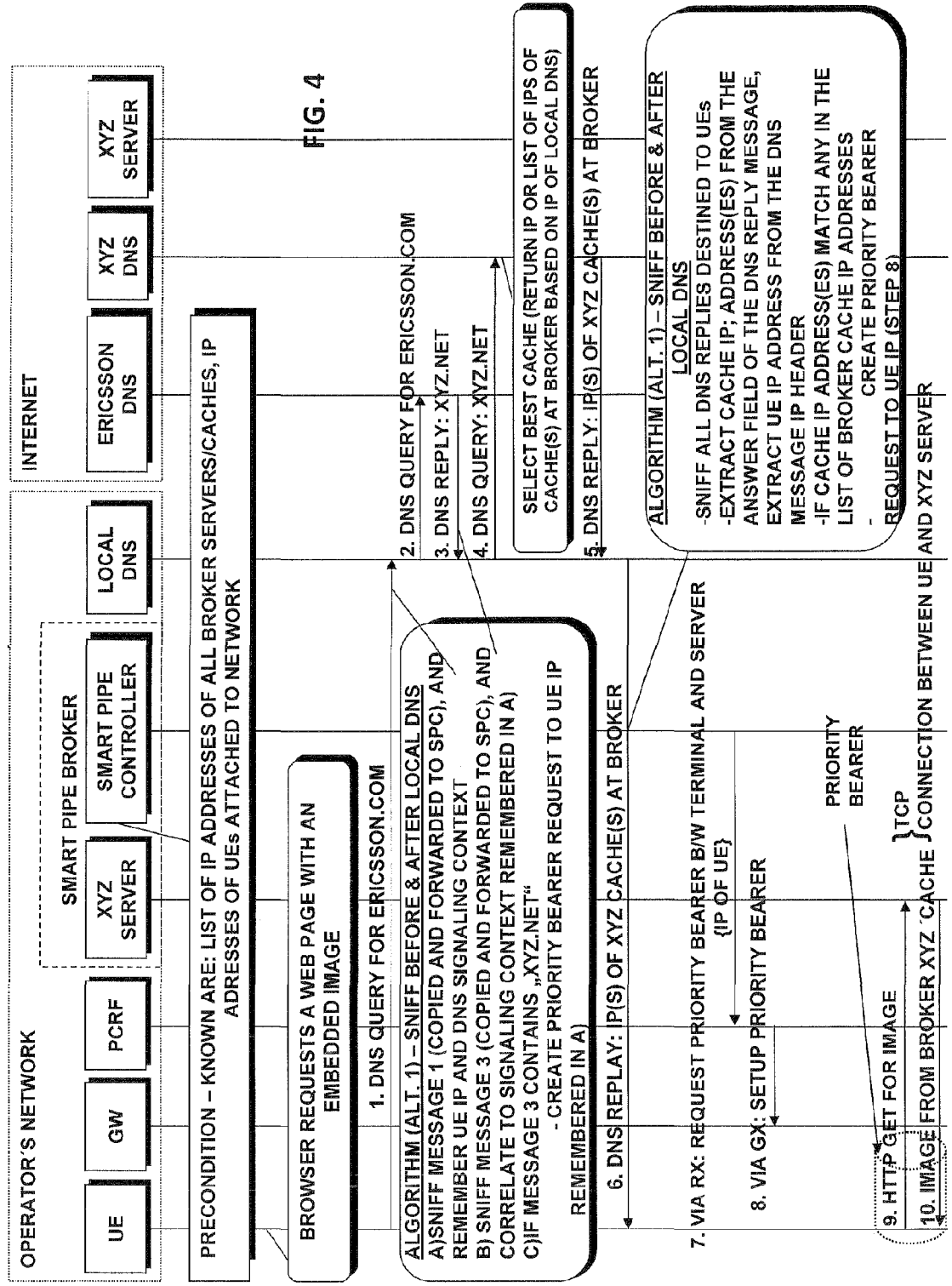
FIG. 4 is a flow chart showing the interaction between the different entities for accelerating the delivery of content from an Internet content provider.

FIG. 4 shows a flow diagram describing the interaction between the different entities of FIG. 2. In the embodiment of FIG. 4 it is assumed that the list of IP addresses of all broker's servers and caches is known. Furthermore, the IP addresses of the mobile user equipments attached to the network are known. In the example of FIG. 4 a browser requests a webpage with an embedded image, the webpage being ericsson.com.

In step 1 a DNS query is sent from the mobile user equipment to the local DNS server. In step 2 a DNS query for ericsson.com is sent to the Ericsson DNS server. As an agreement for accelerated delivery exists the DNS server replies with an address where this information is stored. In step 4 a DNS query is sent to the corresponding DNS server, here the server xyz. net.

As shown in FIG. 4, a first alternative exists in which sniffing is carried out before and after the local DNS message exchange. If a message 3 contains "xyz.net" the content delivery entity knows that the request is a request for a priority bearer and that the IP address of the UE should be remembered that was included in step 1.

The xyz DNS server then selects the best cache and returns an IP or a list of IP addresses of the cache or caches at the broker based on the IP address of the local DNS server. In step 5 a DNS reply method is transmitted back to the local DNS server, the local DNS server replying the DNS message to the UE.

As shown in FIG. 4, a second alternative exists in which only a sniffing is carried out for the local DNS. In this case, sniffing of all DNS replies for the UEs is carried out and the cache IP addresses from the answer field of the DNS reply messages are extracted. The IP address of the UE is extracted from the DNS message IP header. If the cache IP addresses match any of the addresses in the list of the broker cache IP addresses, a priority bearer request for the IP address of the UE is created in step 8 mentioned further below.

In step 7, the controller transmits to the PCRF the request to set up a priority bearer between the terminal and the server, this request being further transmitted to the corresponding gateway. The priority bearer is then set up and a HTTP get message for the image is transmitted to the server and the SmartPipe broker in step 9, in step 10 the image being transmitted from the cache to the UE. In the embodiment of FIG. 4 snooping of DNS traffic is used. In another embodiment the initial traffic towards the edge/cache server from a user triggers the setup of priority either by setting up a dedicated bearer or by upgrading a default bearer.

Figure 5:
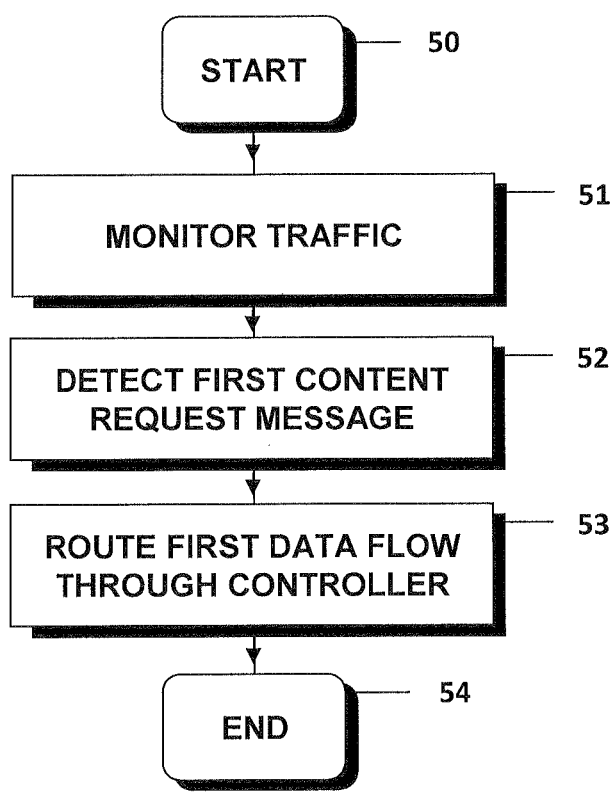
FIG. 5 is a flow chart summarizing the steps carried out to accelerate the content delivery to a mobile user equipment.

In FIG. 5 the method for accelerating the delivery of content to a mobile user equipment is summarized. The method starts in step 50 and in step 51 the traffic is monitored. This traffic can be the DNS traffic as mentioned in FIG. 4. However, it is also possible that content request messages are monitored and that the content request messages are identified which relate to a content server for which a service agreement between the content delivery entity and the Internet's content provider exists. This request is then considered as a first content request message for which the accelerated delivery of content should be initiated (step 52). The content may be cached in the CDN cache 122, or if the content is not contained in the CDN cache, the CDN edge 121 is used that will retrieve it directly from the content provider's server 310 in an accelerated manner. Here the edge server 121 acts a proxy. The traffic is then routed through the controller 110 which controls the priority of the data traffic in the access network (step 53), the method ends in step 54.

The SmartPipe controller may generate per UE (IP address) traffic statistics (e.g. CDRs i.e. Call Detail Records or Charging Data Records). This may help to answer questions such as:
Which terminal types are more active for all/certain CPs?
From which cells do most subscribers connect?
Who are the most active (volume, transactions) subscribers?
What content is most popular with terminal type XYZ?=>Requires DPI in SmartPipe Controller or correlate with CDN logs (available through Radius Accounting messages from GVV).

Furthermore, IMEI based content adaptation is used. The controller 110 provides IMEI to CDN boxes via HTTP header enrichment.

The above ideas may also be applied to IWLAN.

If an operator does not have PCRF/Rx the broker could host the PCRF. In roaming scenarios inbound roamers (home-routed traffic) may not get content acceleration.

The SmartPipe controller may know the IMEI and based on that information may point to the right cache, e.g. one cache which is specially adapted for one type of UE, e.g. iPhone, another cache specially adapted for another type of mobile entity. This situation is an IMEI based DNS redirection.

The invention claimed is:

1. A system configured to deliver a first data traffic that should be treated with priority from a first Internet content provider to a mobile user equipment via an access network of a mobile communications network, the system comprising:
a gateway through which the first data traffic from the first Internet content provider is transmitted to the mobile user equipment and through which a second data traffic from a second Internet content provider is transmitted to the mobile user equipment; and
a content delivery apparatus, the content delivery apparatus comprising:
an interface configured to detect the first data traffic that should be treated with priority;
an acceleration unit configured to accelerate the delivery of the first data traffic from the first Internet content provider to the content delivery apparatus; and
a controller configured to forward the first data traffic from the first Internet content provider to the mobile user equipment in the access network in such a way that the first data traffic from the first Internet content provider is routed to the mobile user equipment in the access network with a priority different from that of the second data traffic that is routed from a second Internet content provider through the access network, and in such a way that the first traffic is delivered faster than the second data traffic, wherein the controller is configured to forward the first data traffic from the first Internet content provider through the controller to the gateway but to not forward the second data traffic through the controller, and wherein the controller is configured to control the gateway to prioritize the forwarded first data traffic over the second data traffic.

2. The system of claim 1, wherein the controller is configured to determine traffic statistics of the first data traffic through the controller.

3. The system of claim 1, wherein the controller is configured to control a specified fraction of a data traffic capacity of the gateway for the first data traffic.

4. The system of claim 1, wherein the acceleration unit comprises a content data network cache server.

5. The system of claim 1, wherein the acceleration unit comprises a content data network edge server.

6. The system of claim 1, wherein the controller is configured to communicate with a policy controller of the mobile communications network through an Rx interface.

7. The system of claim 1, wherein the content delivery apparatus is configured to identify which type of the mobile user equipment is used for requesting the data traffic.

8. The system of claim 1, wherein the controller is configured to control the gateway to prioritize the forwarded first data traffic over the second data traffic by modifying a priority of a default bearer used for the first data traffic.

9. The system of claim 1, wherein the controller is configured to control the gateway to prioritize the forwarded first data traffic over the second data traffic by directing the first data traffic to a dedicated bearer.

10. The system of claim 1, wherein the interface is configured to detect the first data traffic by identifying a destination IP address of packets from the mobile user equipment and a source IP address of packets from the acceleration unit as matching a predefined range of IP addresses.

11. A method for delivering a first data traffic that should be treated with priority from a first Internet content provider to a mobile user equipment via an access network of a mobile communications network, using a system that comprises a gateway through which the first data traffic is transmitted to the mobile user equipment and through which a second data traffic from a second Internet content provider is transmitted to the mobile user equipment, the system further comprising a content delivery apparatus that comprises an interface, an acceleration unit, and a controller, the method comprising:

detecting, by the interface, the first data traffic that should be treated with priority, accelerating, by the acceleration unit, the delivery of the first data traffic from the first Internet content provider to the content delivery apparatus, and forwarding, by the controller, the first data traffic from the first Internet content provider to the mobile user equipment in the access network in such a way that the first data traffic from the first Internet content provider is routed to the mobile user equipment in the access network with a priority different from that of a second data traffic that is routed from a second Internet content provider through the access network and in such a way that the first traffic is delivered faster than the second traffic, wherein the first data traffic is forwarded from the first Internet content provider through the controller to the mobile user equipment but the second data traffic is not forwarded through the controller, and controlling the gateway to prioritize the forwarded first data traffic over the second data traffic.

12. The method of claim 11, further comprising determining traffic statistics of the first data traffic flowing through the content delivery apparatus.

13. The method of claim 11, wherein a content request message from the mobile user equipment is identified as the first content request message when the Internet content provider to which the content request message is directed is contained in a list of Internet content providers for which a service agreement between the content delivery apparatus and the corresponding Internet content provider for fast delivery of data flows exists.

14. The method of claim 11, wherein controlling the gateway to prioritize the forwarded first data traffic over the second data traffic comprises modifying a priority of a default bearer for the duration of the first data traffic.

15. The method of claim 11, wherein controlling the gateway to prioritize the forwarded first data traffic over the second data traffic comprises directing the first data traffic to a dedicated bearer.

16. A controller configured to forward a first data traffic from a first Internet content provider to a mobile user equipment via an access network of a mobile communications network, the controller comprising:

an interface configured to be connected to an acceleration unit that accelerates the delivery of the first data traffic from the first Internet content provider to the controller, and a control circuit configured to forward the first data traffic from the first Internet content provider to the mobile user equipment in the access network in such a way that the first data traffic from the first Internet content provider is routed to the mobile user equipment via a gateway in the access network with a priority different from that of a second data traffic that is delivered to the mobile user equipment from a second Internet content provider through the gateway in the access network and in such a way that the first traffic is delivered faster than the second traffic, wherein the control circuit does not forward the second data traffic through the controller, and wherein the control circuit is further configured to control the gateway to prioritize the forwarded first data traffic over the second data traffic.

17. The controller of claim 16, wherein the control circuit is configured to control the gateway to prioritize the forwarded first data traffic over the second data traffic by modifying a priority of a default bearer used for the first data traffic.

18. The controller of claim 16, wherein the control circuit is configured to control the gateway to prioritize the forwarded first data traffic over the second data traffic by directing the first data traffic to a dedicated bearer.

\* \* \* \* \*

UNITED STATES PATENT AND TRADEMARK OFFICE
CERTIFICATE OF CORRECTION

Page 1 of 1

PATENT NO. : 9,237,480 B2
APPLICATION NO. : 13/880192
DATED : January 12, 2016
INVENTOR(S) : Ludwig et al.

It is certified that error appears in the above-identified patent and that said Letters Patent is hereby corrected as shown below:

On the Title Page, in Column 1, below Item (65), insert -- Related U.S. Application Data (60) Provisional application No. 61/405,889, filed on October 22, 2010. --, therefor.

Specification

In Column 6, Line 63, delete "CP active" and insert -- CP $\Rightarrow$ active --, therefor.

In Column 7, Lines 1-2, delete "measures)" and insert -- measures) $\Rightarrow$ --, therefor.

In Column 11, Line 60, delete "GVV)." and insert -- GW). --, therefor.

Signed and Sealed this
Twelfth Day of April, 2016

Michelle K. Lee
*Director of the United States Patent and Trademark Office*